US010207876B2

(12) United States Patent
Ickert

(10) Patent No.: US 10,207,876 B2
(45) Date of Patent: Feb. 19, 2019

(54) TRANSPORT DEVICE FOR TRAYS

(71) Applicant: MULTIVAC Sepp Haggenmüller SE & Co. KG, Wolfertschwenden (DE)

(72) Inventor: Lars Ickert, Kempten (DE)

(73) Assignee: Multivac Sepp Haggenmueller SE & CO. KG, Wolfertschwenden (DE)

(*) Notice: Subject to any disclaimer, the term of this patent is extended or adjusted under 35 U.S.C. 154(b) by 0 days.

(21) Appl. No.: 15/456,355

(22) Filed: Mar. 10, 2017

(65) Prior Publication Data

US 2017/0267463 A1 Sep. 21, 2017

(30) Foreign Application Priority Data

Mar. 15, 2016 (DE) .......................... 10 2016 204 193

(51) Int. Cl.
| | |
|---|---|
| B65G 47/30 | (2006.01) |
| B65B 43/52 | (2006.01) |
| B65G 47/31 | (2006.01) |
| B65G 19/02 | (2006.01) |
| B65G 15/50 | (2006.01) |
| B65G 15/00 | (2006.01) |
| B65B 57/12 | (2006.01) |
| B65B 7/16 | (2006.01) |

(52) U.S. Cl.
CPC .............. *B65G 47/31* (2013.01); *B65B 7/164* (2013.01); *B65B 43/52* (2013.01); *B65B 57/12* (2013.01); *B65G 15/00* (2013.01); *B65G 15/50* (2013.01); *B65G 19/02* (2013.01); *B65G 47/30* (2013.01); *B65G 2201/0258* (2013.01)

(58) Field of Classification Search
CPC ...................................................... B65G 47/31
USPC ............ 198/459.6, 459.7, 419.1, 451, 462.1
See application file for complete search history.

(56) References Cited

U.S. PATENT DOCUMENTS

| | | | |
|---|---|---|---|
| 7,452,179 B2* | 11/2008 | Boriani | B65G 47/71 |
| | | | 198/436 |
| 8,857,605 B2* | 10/2014 | Valli | B65G 21/14 |
| | | | 198/339.1 |
| 2004/0226261 A1 | 11/2004 | Graffin | |
| 2009/0266677 A1* | 10/2009 | Oppici | B65G 47/084 |
| | | | 198/459.6 |
| 2011/0168525 A1 | 7/2011 | Vasse et al. | |

(Continued)

FOREIGN PATENT DOCUMENTS

| | | |
|---|---|---|
| DE | 4002724 A1 | 8/1991 |
| DE | 19822837 C1 | 10/1999 |
| DE | 102011014495 A1 | 9/2012 |

(Continued)

*Primary Examiner* — Gene O Crawford
*Assistant Examiner* — Lester Rushin, III
(74) *Attorney, Agent, or Firm* — Husch Blackwell LLP

(57) ABSTRACT

A transport device for transporting trays. The transport device including a first conveyor belt and a second conveyor belt that is downstream and follows the first conveyor belt. The first and second conveyor belts may have either a single- or multi-track design. The second conveyor belt may include a parallelization device configured to slowing down and/or accelerate one or more trays being conveyed on the second conveyor. The parallelization device may comprises at least one carrier with at least one acceleration finger and may be selectively moveable to prevent, slow down, allow, or accelerate a movement of a tray.

18 Claims, 6 Drawing Sheets

(56) References Cited

U.S. PATENT DOCUMENTS

2013/0220772 A1 8/2013 Vasse et al.
2014/0374217 A1 12/2014 Buchenberg

FOREIGN PATENT DOCUMENTS

DE 102012004372 A1 9/2013
EP 1574431 A1 9/2005

\* cited by examiner

TRANSPORT DEVICE FOR TRAYS

CROSS-REFERENCE TO RELATED APPLICATIONS

This Application claims priority to German Patent Application Number 102016204193.2 filed Mar. 15, 2016, to Lars Ickert, currently pending, the entire disclosure of which is incorporated herein by reference.

FIELD OF THE INVENTION

The invention relates to a transport device for trays that improves the group formation of the trays during conveyance.

BACKGROUND OF THE INVENTION

A feeding unit of a tray sealing machine is known from the EP 1574431 A1. The feeding unit comprises a double-track feeding conveyor and a double-track accumulating conveyor to feed trays, which arrive arbitrarily on the feeding conveyor, in connection with the accumulating conveyor as a group of trays with predetermined spacing to one another in a gripper system of the tray sealing machine to create an airtight packaging At a high performance and if the friction force and/or grip of the trays in the accumulating conveyor is impaired for example due to contamination by liquid product remainders, the system will reach its limits In this context, major position deviations of the trays in relation to one another and of the group may occur.

SUMMARY OF THE INVENTION

The purpose of the invention is to provide an alternative feeding unit with an improved group formation of trays. The transport device according to the invention for transporting trays comprises a first conveyor belt and a second conveyor belt that follows the first conveyor belt, wherein the conveyor belts each have a single- or multi-track design. The transport device according to the invention is characterized in that the second conveyor belt as a module may slow down and/or to accelerate one or several trays using a parallelization device comprising at least one carrier having at least one acceleration finger. In case of a single-track transport device, this allows for influencing the position of the tray on the second conveyor belt regardless of its velocity in order to improve group formation of successive trays. For example on a subsequent grouping conveyor or to ensure the distances between two successive trays within one group with minimum deviations from the predetermined spacing.

In a double- or multi-track design, differently (subsequently) arriving trays can be set parallel to one another on the second conveyor belt using of the acceleration fingers, i.e. the position of the front edges or front walls of trays moved next to one another can be aligned so that a synchronous and parallel handover from the second conveyor belt to a grouping conveyor can be achieved. In this process, the first and second conveyor belt can be operated respectively at a constant velocity during normal operation.

The first conveyor belt is preferably designed as a large flat strap, chain feeder, multi-strap conveyor or as a link chain conveyor in order to transport trays on multiple layers in a structurally simple way with only a single drive.

The second conveyor belt preferably has several straps in order to let the acceleration fingers move upwards from the bottom and plunge downwards in relation to the transport plane for the trays, which corresponds to the top side and/or transport plane of the straps.

The velocity of the first conveyor belt and the velocity of the second conveyor belt are thereby different in relation to one another; the velocity of the second conveyor belt is preferably slightly higher than the velocity of the first conveyor belt in order to space and/or to separate trays that are next to one another and that touch one another during transition to the second conveyor belt.

In a particularly preferred embodiment, both the first conveyor belt and the second conveyor belt may have a double-track design to be able to feed the trays to a grouping conveyor of a double-track tray sealing machine at a very high performance level and with a very accurate grouping mechanism.

The parallelization device may be preferably arranged below a transport plane of the trays.

Each carrier preferably has at least two, in particular three acceleration fingers that are arranged evenly and/or symmetrically on the outer circumference of the carrier so that the carrier can take the position in which no acceleration finger may be located in the collision area of the tray. For example, all acceleration fingers may be selectively located under the transport plane so a tray can be transported away above of it.

The carriers can preferably be moved (positioned) rotatively, linearly in two directions, or by a belt drive in order to be able to bring the acceleration fingers in appropriate contact with the tray during parallelization.

The parallelization device preferably comprises a servo drive to enable high velocities and accelerations.

In a preferred embodiment, one sensor may be provided for each track that is connected to a control for the parallelization device and that is provided upstream of the parallelization device, preferably at the end of the first conveyor belt.

A method according to the invention for operating a transport device for transporting trays, which comprises a first conveyor belt and a second conveyor belt that follows the first conveyor belt, wherein the conveyor belts have a single- or multi-track design, is characterized in that a parallelization device accelerates and/or slows down one or multiple trays while the trays are located on the second conveyor belt.

In this process, the trays are slowed down and/or accelerated preferably by one or several acceleration fingers of the parallelization device through form-closure.

In a particularly preferred embodiment, two trays that are laterally adjacent in the production direction are slowed down and/or accelerated in this way, wherein these two trays are handed over, while moving in parallel to one another, to a grouping conveyor of a tray sealing machine that follows the second conveyor belt.

Other aspects and advantages of the present invention will be apparent from the following detailed description of the preferred embodiments and the accompanying drawing figures.

DESCRIPTION OF THE SEVERAL VIEWS OF THE DRAWING

In the following, an advantageous embodiment of the present invention will be explained in more detail making reference to the following drawings, in which the individual figures show.

DETAILED DESCRIPTION OF THE INVENTION

Figure 1:
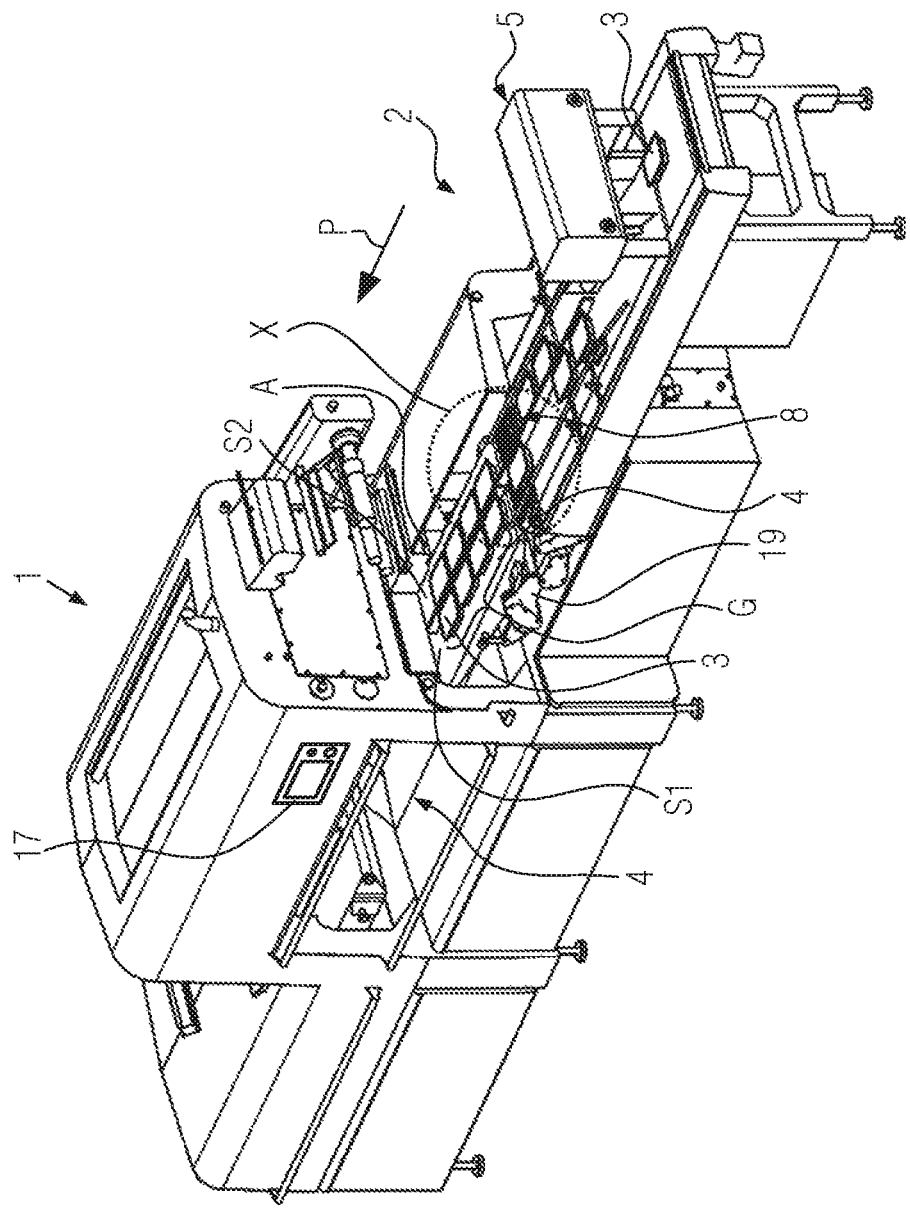
FIG. 1 is a perspective view of one embodiment of a tray sealing machine having a transport device in accordance with the teachings of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a tray sealing machine 1 for cyclic sealing a group of two times four trays 3 with a lid film (not shown in greater detail), and a transport device 2. The trays 3 are fed on tracks and in groups with respectively four trays 3 along a first track S1 and a second track S2 on a grouping conveyor 4 of a sealing device 5 of the tray sealing machine 1. The two groups G are located on the grouping conveyor 4 in such a way that trays 3 follow one another within a group G in a production direction P, and have a predetermined distance A in order for the trays to be recordable in a gripping system (not shown) and to be transportable into the sealing station 5.

Figure 2:
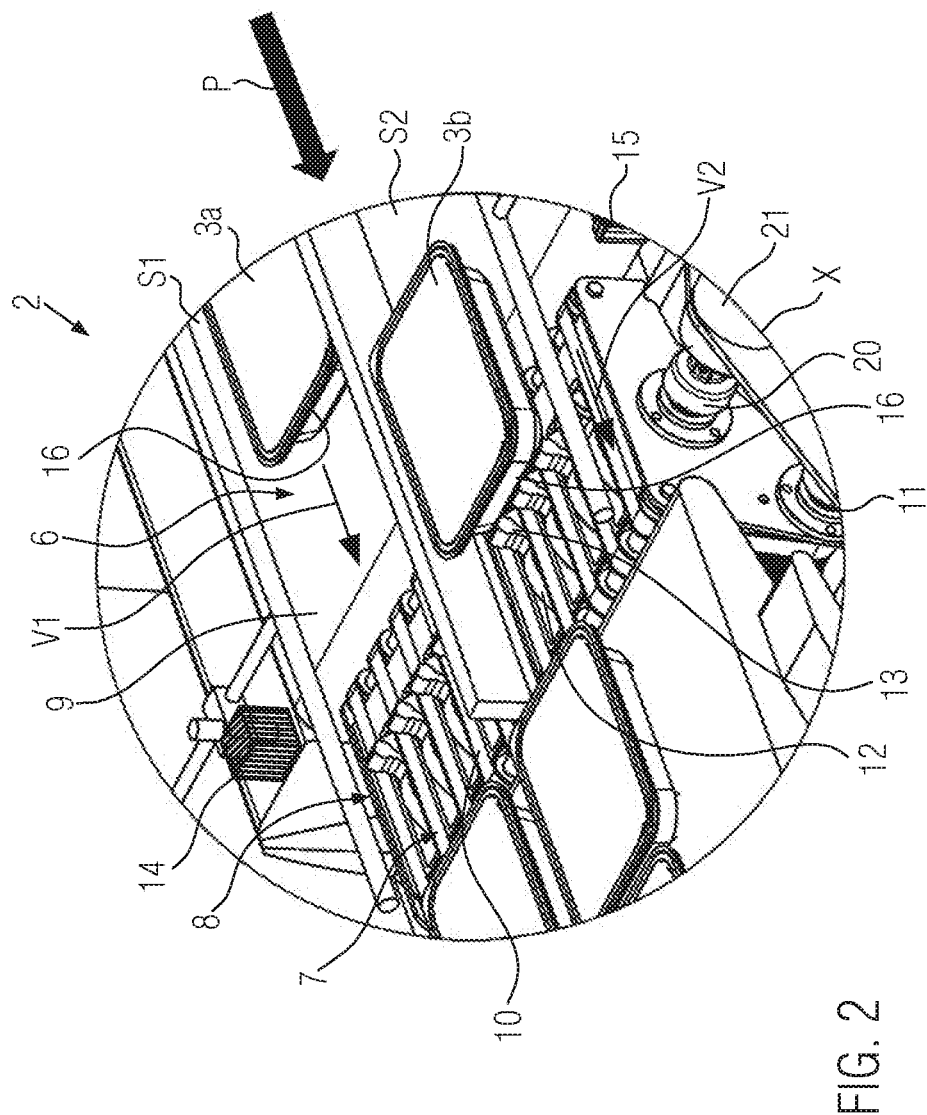
FIG. 2 is a blown-up portion of a the perspective view of FIG. 1 wherein a section of the transport device is in a first phase.

The trays 3 are handed over on a single track to the transport device 2, in this illustration by a production unit that is not displayed in greater detail, and distributed alternatingly on the two tracks S1 and S2 of a first conveyor belt 6 via a distributing unit 5, see FIG. 2. As further shown in FIG. 2, the trays 3 are handed from the first conveyor belt 6 to a second conveyor belt 7 of the transport device 2. The second conveyor belt 7 comprises a parallelization device 8 for form-closing braking and/or acceleration of the trays 3 in order to align the right tray 3a on the right track S1 in the production direction P and the left tray 3b on the left track S2 in a parallel fashion in relation to their front sides and to hand them over to the grouping conveyor 4. In the following, this process shall be referred to as "parallelization". In the FIGS. 2 to 5, the procedure during parallelization will be described in greater detail based on an enlarged section view X of FIG. 1.

FIG. 2 shows a section X of the transport device 2 with the first conveyor belt 6, on which a right tray 3a on the right track S1 and a left tray 3b on the left track S2 can be fed to the second conveyor belt 7 in the production direction P. The right tray 3a is thereby slightly recessed in relation to the first tray 3b. The first conveyor belt 6 has flat straps 9 for each of the tracks S1, S2. The flat straps 9 are driven jointly and therefore synchronously by an electric engine drive, which is not illustrated in greater detail, preferably at a constant velocity V1.

The second conveyor belt 7 has five straps 10 per track S1, S2 that are driven jointly and synchronously via a drive 11. The drive 11 comprises an electric engine, preferably a servo engine, in order to drive the straps 10 with a constant velocity V2. In this context, the velocity V2 of the second conveyor belt 7 is preferably higher than the velocity V1 of the first conveyor belt 6 in order to space adjacent trays 3 on a common track S1, S2 during transition from the first conveyor belt 6 to the second conveyor belt 7.

The second conveyor belt 7 comprises a parallelization device 8 for slowing down and accelerating the trays 3a and 3b. In the shown embodiment, the parallelization device 8 comprises four carriers 12 per track S1, S2. Every single carrier 12 has three acceleration fingers 13 that are arranged evenly along the circumference in a distribution of 3×120°. The carriers 12 are arranged respectively between two adjacent, parallel, and extending straps 10. The carriers 12 are arranged on a joint shaft 20 and are driven by a drive 21, preferably a servo drive.

FIG. 2 also shows a right sensor 14 to record trays 3a on the right track S1 and a left sensor 15 to record trays 3b on the left track S2. The front wall 16 of the tray 3 that moves ahead in the production direction is preferably recorded by the sensors 14, 15. The sensors 14, 15 can be formed as light barriers.

FIG. 2 shows a first phase in which the left tray 3b passes the left sensor 15, which is arranged in the transition area from the first conveyor belt 6 to the second conveyor belt 7, and a control 17 of the tray sealing machine 1, see FIG. 1, or an individual control of the transport device 2 controls the carriers 12 according to the signal of the left sensor 15 and the velocity V2 of the second conveyor belt 7 in such a way that the acceleration fingers 13 absorb the left tray 3b on its front wall 16 and/or come in contact as the velocity V3 of the acceleration fingers 13 adapts in the production direction P to the velocity V2 of the left tray 3b and whereby the left tray 3b is subsequently slowed down and/or negatively accelerated in order to hold the left tray 3b on the second conveyor belt 7 until the right tray 3a reaches the acceleration fingers 13 on the right track S1. In this process, the right tray 3a passes the right sensor 14.

Figure 3:
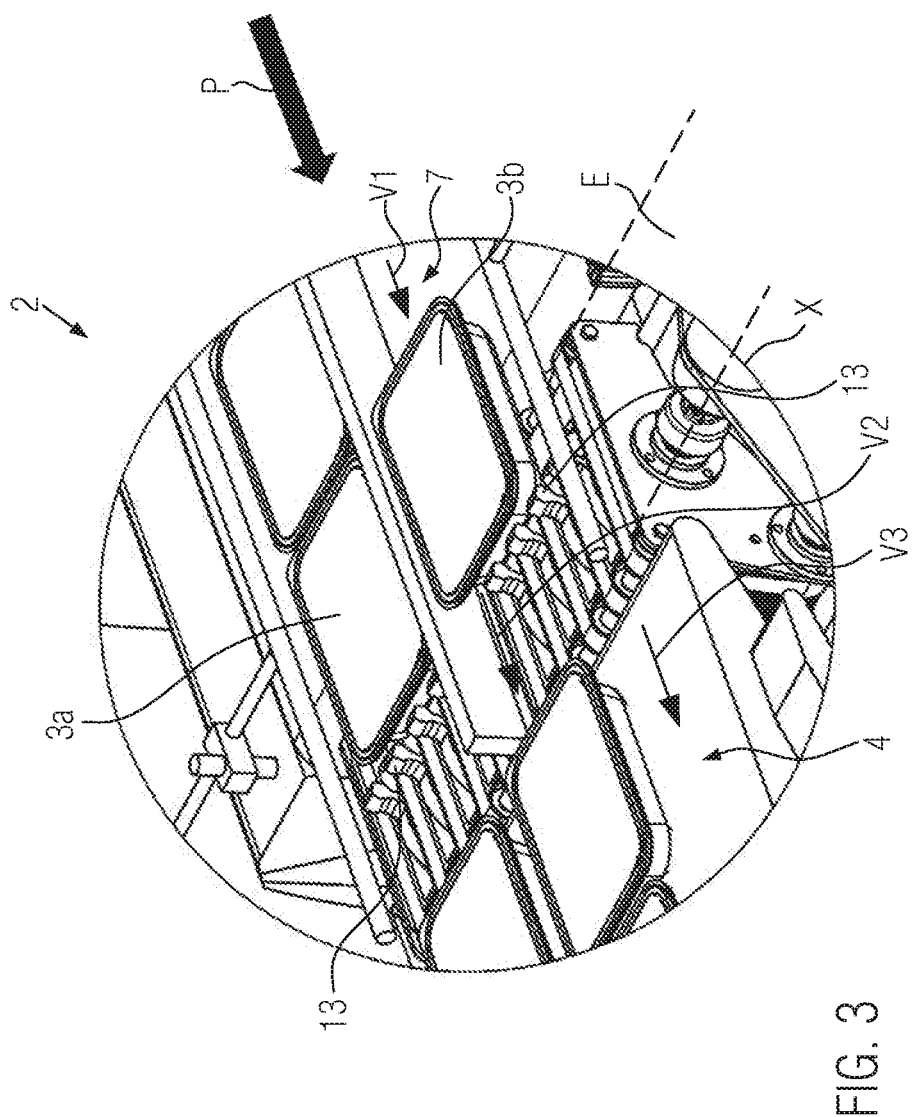
FIG. 3 is a blown-up portion of a the perspective view of FIG. 1 wherein a section of the transport device is in a second phase.

FIG. 3 shows a second phase in which the two trays 3a, 3b fit closely to the acceleration finger 13 and are thereby in a parallel position in relation to one another. The acceleration fingers 13 are accelerated up to the velocity V2 of the second conveyor belt 7 and even faster in order to plunge downwards between the straps 10, i.e. to plunge under a transport plane E that is defined by the top side of the straps 10 that move the trays 3 before the trays 3a, 3b are handed over to the following grouping conveyor 4. The velocity V3 of the grouping conveyor 4 can thereby be synchronized with the velocity V2 of the second conveyor belt 7. Also the grouping conveyor 4 comprises an electric engine drive, preferably a servo engine drive 19 (see FIG. 1).

Figure 4:
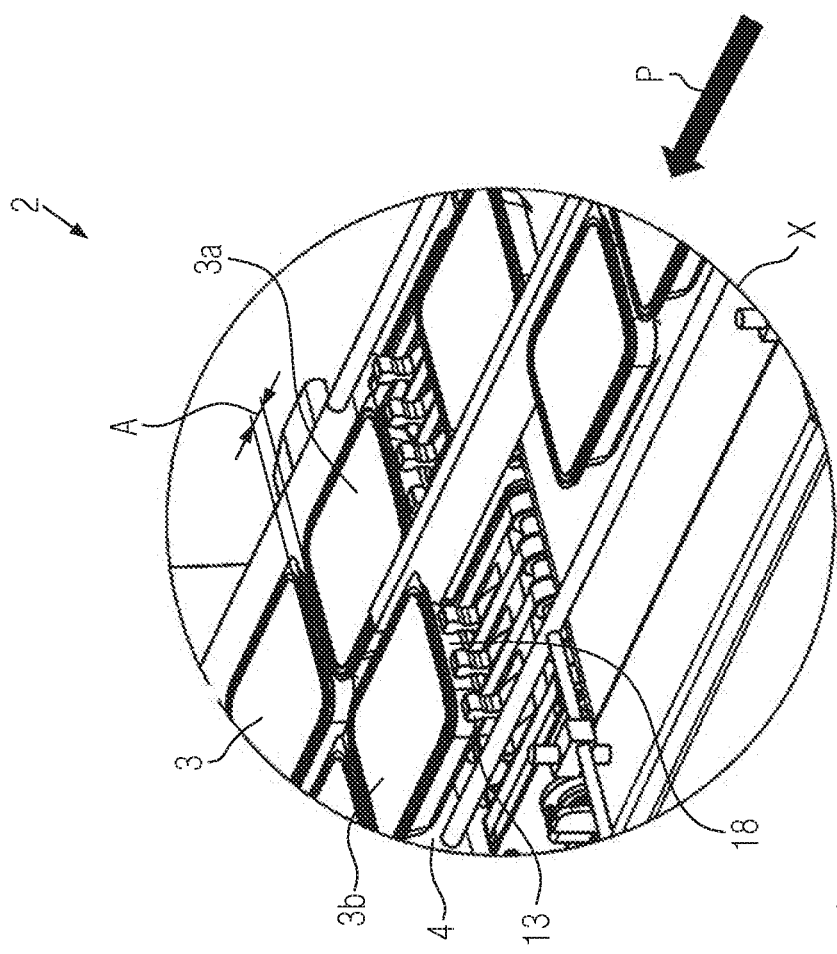
FIG. 4 is a blown-up portion of a the perspective view of FIG. 1 viewed from behind wherein a section of the transport device is in a third phase.

FIG. 4 shows the transport device 2 in a third phase in which the trays 3a, 3b are already partially on the grouping conveyor 4 and in which the acceleration fingers 13 approach a rear wall 18 of the trays 3a, 3b from behind in order to push the trays 3a, 3b with a velocity that is preferably a bit higher than the velocity V2 of the second conveyor belt 7 or the velocity V3 of the grouping conveyor 4, regardless of whether the velocities V2 and V3 are synchronized or not. The illustrated pushing process is optional and is also used for parallelization of the trays 3a and 3b in relation to one another or also for positioning of the trays 3a and 3b on the grouping conveyor 4 opposite to the trays 3 that are moving ahead, in order to achieve a distance A, which is predetermined as accurately as possible, between successive trays 3.

Figure 5:
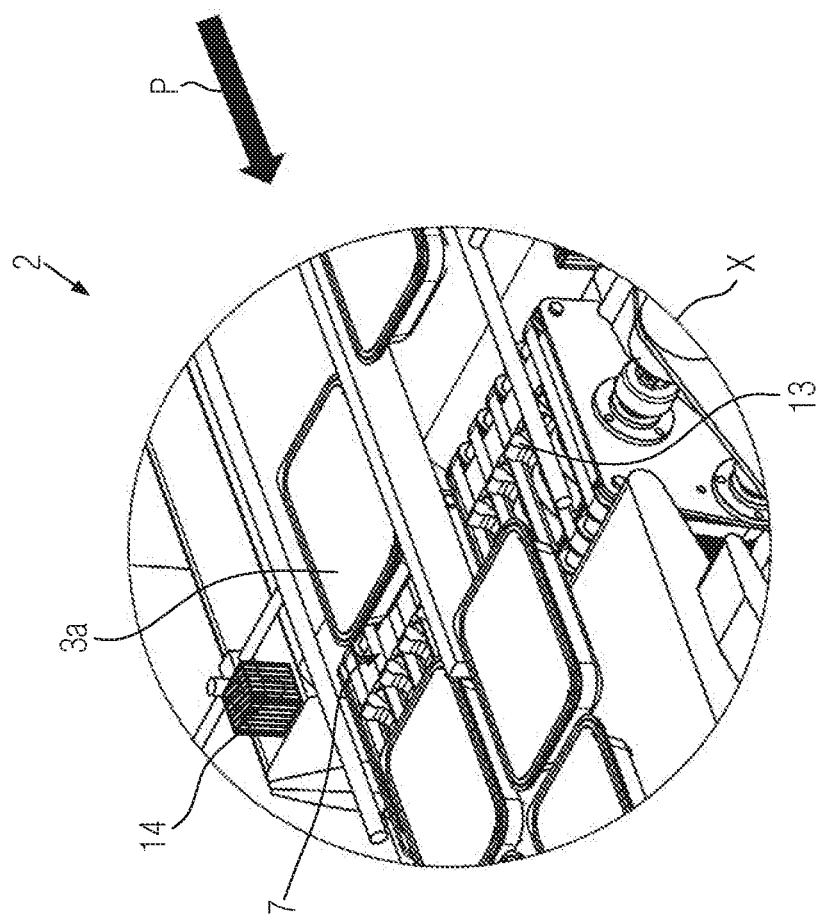
FIG. 5 is a blown-up portion of a the perspective view of FIG. 1 wherein a section of the transport device is in a fourth phase.

FIG. 5 shows the transport device 2 in a fourth phase, the so-called waiting phase, in which the acceleration fingers 13 are at rest, until the next tray 3, here a right tray 3a, is detected by the right sensor 14 and handed over to the second conveyor belt 7 in the production direction P.

Figure 6:
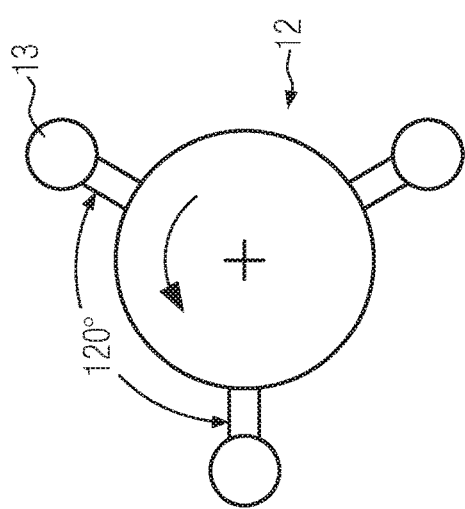
FIG. 6 is a schematic side view of one embodiment of a carrier in accordance with the teachings of the present invention.

FIG. 6 shows the carrier 12 in a first embodiment as a disc that can be driven in rotation with three acceleration fingers 13 that are arranged symmetrically at a spacing of one hundred twenty degrees (120°).

Figure 7:
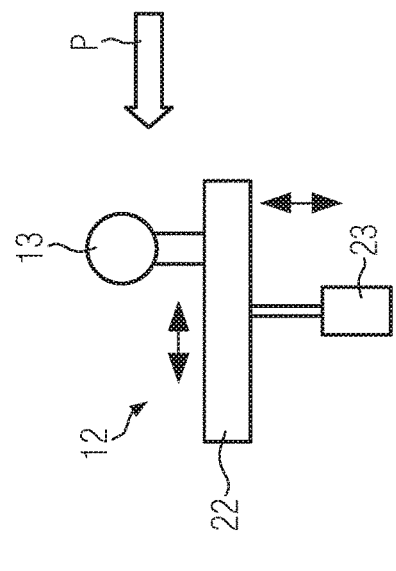
FIG. 7 is a schematic side view of one embodiment of a carrier in accordance with the teachings of the present invention.

FIG. 7 shows the carrier 12 of a second embodiment, wherein an acceleration finger can be moved by means of a first horizontal linear unit 22 in a longitudinal direction that is identical to the production direction P and in addition vertically by means of a second vertical linear drive unit or lifting unit 23.

Figure 8:
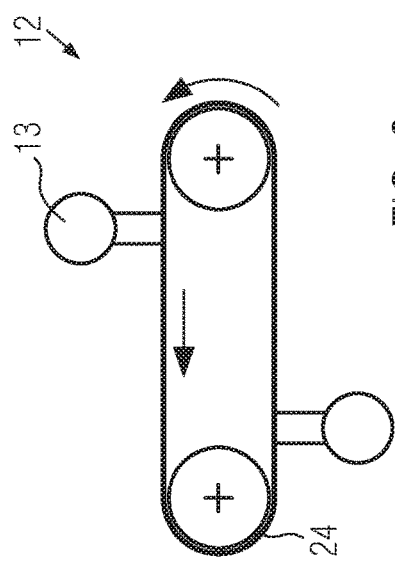
FIG. 8 is a schematic side view of one embodiment of a carrier in accordance with the teachings of the present invention.

FIG. 8 shows the carrier 12 designed as a belt drive 24 on which two acceleration fingers 13 are arranged.

All embodiments have in common that the control 17 is configured to change the velocity and acceleration of the acceleration finger 13 in such a way as to approach the tray 3 and/or its front wall 16 or its rear wall 18 very smoothly and to perform the parallelization process if possible without a stop of the tray 3 itself and/or to avoid high accelerations or a jolt in order to prevent for example slopping over of liquid products beyond the tray 3 while increasing the transport performance at the same time.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A transport device for transporting trays, the transport device comprising:
   a first conveyor belt driven to transport trays at a first transport velocity; and
   a second conveyor belt that follows the first conveyor belt, where in the second conveyor belt is driven to transport trays at a second transport velocity;
   wherein both the first conveyor belt and the second conveyor belt having either a single-track or a multi-track configuration, wherein the second conveyor belt has a parallelization device being selectively moveable and configured to slow down and/or accelerate one or more trays relative to one of the first transport velocity or the second transport velocity, the parallelization device comprising at least one carrier having at least one acceleration finger selectively movable to engage said trays on said second conveyor belt; wherein the parallelization device is disposed below a top side of the second conveyor belt.

2. A transport device according to claim 1, wherein the first conveyor belt is one of a large flat strap, a chain feeder belt, a multi-strap conveyor, or a link chain conveyor belt.

3. A transport device according to claim 1, wherein the second conveyor belt includes a plurality of straps.

4. A transport device according to claim 1, wherein the first velocity of the first conveyor belt and the second velocity of the second conveyor belt are different.

5. A transport device according to claim 1, wherein the first conveyor belt and the second conveyor belt each include two tracks.

6. A transport device according to claim 1, wherein the parallelization device has a plurality of carriers that are arranged in parallel to one another.

7. A transport device according to claim 1, wherein each one of the at least one carrier has at least two acceleration fingers.

8. A transport device according to claim 7, wherein the plurality of carriers can be moved in one of the following ways: rotated about an axis of rotation, linearly in two directions, or using a belt drive.

9. A transport device according to claim 1, wherein the parallelization device comprises a servo drive.

10. A transport device according to claim 1, further comprising a sensor in communication with a control system for the parallelization device and wherein the sensor is disposed upstream of the parallelization device and is provided to monitor each track of either said single-track or said multi-track configuration.

11. A tray sealing packaging machine comprising a transport device according to claim 1.

12. A method for operating a transport device for transporting a plurality of trays, the method comprising:
   arranging a first conveyor belt upstream of a second conveyor belt, wherein said second conveyor belt is disposed to follow the first conveyor belt;

conveying a plurality of trays in at least one track of said first conveyor belt at a first transport velocity;

conveying a plurality of trays in at least one track of said second conveyor belt at a second transport velocity;

slowing down or accelerating the conveyance of one or more of said plurality of trays relative to one of the first transport velocity or the second transport velocity using a parallelization device while the one or more of said plurality of trays are disposed on the second conveyor belt;

wherein the slowing down or accelerating the conveyance of one or more of said plurality of trays using a parallelization device comprises the step of selectively moving at least one acceleration finger of the parallelization device between a first position above a top side of the second conveyor belt and a second position below said top side of the second conveyor belt.

13. A method according to claim 12, further comprising the step of slowing down or accelerating the conveyance of one of two or more of said plurality of trays that are laterally adjacent to one another in the production direction so that the two or more of said plurality of trays that are laterally adjacent to one another are in a parallel arrangement when transferred to a grouping conveyor of a tray sealing machine that is downstream and follows the second conveyor belt.

14. A transport device according to claim 1, wherein the at least one acceleration finger is selectively moveable between a first position above the top side of the second conveyor belt and a second position below said top side of the second conveyor belt.

15. A transport device according to claim 1, wherein the parallelization device comprises a plurality of carriers that are arranged in parallel to one another, and each of the plurality of carriers comprises at least two acceleration fingers.

16. A transport device according to claim 15, wherein each of the plurality of carriers comprises three acceleration fingers disposed in a radially equidistant manner about an axis of rotation of the carrier.

17. A transport device for transporting trays, the transport device comprising:

a first conveyor belt for transporting one or more trays at a first transport velocity; and a second conveyor belt that follows of the first conveyor belt, the second conveyor belt transports one or more trays at a second transport velocity, wherein both the first conveyor belt and the second conveyor belt having either a single-track or a multi-track configuration, wherein the second conveyor belt has a parallelization device configured to slow down and/or accelerate one or more trays relative to one of the first transport velocity or the second transport velocity, the parallelization device comprising at least one carrier having at least one acceleration finger;

wherein the second conveyor belt includes a plurality of belt straps and said at least one acceleration finger is disposed between two belt straps of the plurality of straps and said at least one acceleration finger is selectively moveable between a first position above a top side of the second conveyor belt and a second position below said top side of the second conveyor belt.

18. A transport device according to claim 17, wherein the parallelization device comprises a plurality of carriers that are arranged in parallel to one another, and at least one of the plurality of carriers is disposed between two belt straps of the plurality of belt straps of the second conveyor belt and the at least one of the plurality of carriers comprises at least two acceleration fingers.

* * * * *